(12) United States Patent
Farley et al.

(10) Patent No.: US 11,865,946 B2
(45) Date of Patent: Jan. 9, 2024

(54) CONTROLLER, VEHICLE AND METHOD

(71) Applicant: JAGUAR LAND ROVER LIMITED, Coventry (GB)

(72) Inventors: Michael Farley, Leamington Spa (GB); Nilabza Dutta, Coventry (GB); Richard Owen, Coventry (GB); Giuseppe Patti, Leamington Spa (GB)

(73) Assignee: Jaguar Land Rover Limited, Coventry (GB)

( * ) Notice: Subject to any disclaimer, the term of this patent is extended or adjusted under 35 U.S.C. 154(b) by 234 days.

(21) Appl. No.: 17/422,152

(22) PCT Filed: Jan. 8, 2020

(86) PCT No.: PCT/EP2020/050302
§ 371 (c)(1),
(2) Date: Jul. 9, 2021

(87) PCT Pub. No.: WO2020/144227
PCT Pub. Date: Jul. 16, 2020

(65) Prior Publication Data
US 2022/0089061 A1   Mar. 24, 2022

(30) Foreign Application Priority Data
Jan. 10, 2019  (GB) .................................. 1900343

(51) Int. Cl.
*B60L 58/26*  (2019.01)
*B60H 1/00*  (2006.01)
(Continued)

(52) U.S. Cl.
CPC .......... *B60L 58/26* (2019.02); *B60H 1/00385* (2013.01); *B60W 30/182* (2013.01);
(Continued)

(58) Field of Classification Search
CPC .. B60L 58/26; B60L 2240/34; B60L 2240/36; B60L 2240/545; B60L 2260/26;
(Continued)

(56) References Cited

U.S. PATENT DOCUMENTS 6,988,670 B2 * 1/2006 Keen .................. B60H 1/00792
454/75
9,352,635 B1 * 5/2016 Schepmann ....... B60H 1/00392
(Continued)

FOREIGN PATENT DOCUMENTS

WO   2012056135 A1   5/2012

OTHER PUBLICATIONS

International Search Report corresponding to International Application No. PCT/EP2020/050302, dated May 18, 2020, 4 pages.
(Continued)

*Primary Examiner* — Mussa A Shaawat
(74) *Attorney, Agent, or Firm* — Reising Ethington P.C.

(57) ABSTRACT

A controller (100) for a vehicle (1), the vehicle comprising:
a powertrain (1P) comprising an electric machine (50) for providing motive power;
cooling means (60, 80); and
electrical energy storage means (70) for powering the electric machine (50),
wherein the cooling means (60, 80) is configured to cool the electrical energy storage means (70) and a cabin (1C) of the vehicle and the vehicle (1) is configured to operate in a first or second driving mode,
the controller (100) comprising:
an input for receiving information indicative of a temperature of the energy storage means (70); and
a processor arranged to generate a control signal in dependence on the information indicative of temperature of the energy storage means (70) and information indicative of the selected driving mode of the vehicle,
(Continued)

wherein:
if the vehicle is in the first driving mode the processor is configured to generate the control signal to limit or reduce an amount of power consumed by the powertrain (1P) in dependence on the information indicative of temperature of the energy storage means (70); and/or
if the vehicle is in the second driving mode the processor is configured to generate the control signal to control a proportion of the cooling power of the cooling means that is available to cool the electrical energy storage means relative to the cabin (1C) of the vehicle (1) in dependence on the information indicative of temperature of the energy storage means (70).

15 Claims, 6 Drawing Sheets (51) Int. Cl.
*B60W 30/182* (2020.01)
*B60W 10/26* (2006.01)
*B60W 10/30* (2006.01)

(52) U.S. Cl.
CPC ....... *B60L 2240/34* (2013.01); *B60L 2240/36* (2013.01); *B60L 2240/545* (2013.01); *B60W 10/26* (2013.01); *B60W 10/30* (2013.01)

(58) Field of Classification Search
CPC .... B60W 30/182; B60W 10/26; B60W 10/30; B60H 1/00385; Y02T 10/70
See application file for complete search history.

(56) References Cited

U.S. PATENT DOCUMENTS

| | | |
|---|---|---|
| 2010/0076647 A1 | 3/2010 | Kamichi et al. |
| 2010/0236770 A1* | 9/2010 | Pursifull ............ B60H 1/00764 165/202 |
| 2011/0083449 A1 | 4/2011 | Louch et al. |
| 2013/0020046 A1* | 1/2013 | Momose ............ B60H 1/00428 165/11.1 |
| 2013/0192272 A1* | 8/2013 | Ranalli ................... B60L 1/003 62/3.3 |
| 2013/0221928 A1* | 8/2013 | Kelty ...................... B60L 58/24 320/134 |
| 2015/0104680 A1 | 4/2015 | Wang et al. |
| 2015/0191073 A1* | 7/2015 | Bjorkerud .......... B60H 1/00828 454/75 |
| 2015/0217623 A1* | 8/2015 | Hatakeyama ............. B60L 1/02 429/62 |
| 2018/0001784 A1* | 1/2018 | Porras .................... B60K 11/02 |
| 2018/0215231 A1* | 8/2018 | Porras .................... B60L 58/26 |
| 2019/0111791 A1* | 4/2019 | Wrobel ................... B60H 1/004 |
| 2019/0168576 A1* | 6/2019 | Larson ............... B60H 1/00885 |

OTHER PUBLICATIONS

Written Opinion corresponding to International Application No. PCT/EP2020/050302, dated May 18, 2020, 8 pages.
Combined Search and Examination Report corresponding to Great Britain Application No. GB1900343.3, dated Jun. 19, 2019, 5 pages.

* cited by examiner

CONTROLLER, VEHICLE AND METHOD

TECHNICAL FIELD

The present disclosure relates to a controller, vehicle, and method for controlling operation of an electric vehicle or hybrid electric vehicle. In particular but not exclusively the present disclosure relates to the management of the temperature of an energy storage device during periods when the energy storage device is subject to relatively high loads. Aspects of the invention relate to a controller, apparatus, a vehicle and a method.

BACKGROUND

The present inventors have recognised that, in the case of electric vehicles or hybrid vehicles having an electric vehicle (EV) mode, cooling of a battery of the vehicle may be challenging during periods of high current draw such as when the vehicle is driving at speed for extended periods.

It is an aim of the present invention to address one or more disadvantages associated with the prior art.

SUMMARY OF THE INVENTION

Aspects of the invention provide a controller, a vehicle and a method as claimed in the appended claims.

According to an aspect of the present invention there is provided a controller for a vehicle, the vehicle comprising:
  a powertrain comprising an electric machine for providing motive power;
  cooling means; and
  electrical energy storage means for powering the electric machine,
  wherein the cooling means is configured to cool the electrical energy storage means and a cabin of the vehicle and the vehicle is configured to operate in a first or second driving mode,
  the controller comprising:
  an input for receiving information indicative of a temperature of the energy storage means; and
  a processor arranged to generate a control signal in dependence on the information indicative of temperature of the energy storage means and information indicative of the selected driving mode of the vehicle,
  wherein:
  if the vehicle is in the first driving mode the processor is configured to generate the control signal to limit or reduce an amount of power drawn from the electrical energy storage means by the powertrain in dependence on the information indicative of temperature of the energy storage means; and/or
  if the vehicle is in the second driving mode the processor is configured to generate the control signal to control a proportion of the cooling power of the cooling means that is available to cool the electrical energy storage means relative to the cabin of the vehicle in dependence on the information indicative of temperature of the energy storage means.

Embodiments of the present invention have the advantage that driver enjoyment of a vehicle when driving in the first and/or second driving mode may be enhanced. This is at least in part because in some embodiments of the invention the controller may cause a derating of the performance of a powertrain in order to preserve cabin cooling. In some embodiments of the invention the controller may in addition, or instead, cause a derating of cabin cooling in order to preserve vehicle powertrain performance.

It is to be understood that the enforced application of a limitation or a reduction in power consumption from the electrical energy storage means by a powertrain or a reduction in cabin cooling may result in reduced user enjoyment of a vehicle, depending on the selected driving mode. Accordingly, some embodiments of the present invention may reduce or limit inconvenience experienced by a user when operating the vehicle by derating the powertrain power consumption from the electrical energy storage means and/or cabin cooling according to the temperature of the electrical energy storage means in dependence on the selected driving mode. Thus, a user may select a driving mode according to their preference for powertrain performance or cabin cooling performance.

In some embodiments the cooling means may also be powered by the electrical energy storage means.

Optionally, the processor may have an input for receiving information indicative of the selected driving mode of the vehicle.

The controller may be configured to limit or reduce the amount of power drawn by the powertrain from the electrical energy storage means by reducing a maximum speed of the vehicle below a nominal maximum for the selected driving mode, optionally the processor being further configured to provide an indication to a user that reduced powertrain performance may be experienced.

Thus, in some embodiments, if the vehicle is operating in the first driving mode and the controller limits or reduces the amount of power drawn by the powertrain from the electrical energy storage means, the processor may provide an indication to a user that selection of a different driving mode, such as the second driving mode, may restore powertrain performance.

It is to be understood that different driving modes may have different maximum permitted vehicle speeds for operation in that driving mode, the vehicle being configured not to permit speeds in excess of the respective maximum for the selected driving mode. In some embodiments, the maximum vehicle speed may not be dependent on the selected driving mode, i.e. it may be independent of the selected driving mode.

The controller may be configured to limit or reduce the amount of power drawn from the electrical energy storage means by the powertrain by reducing the maximum amount of power that may be drawn from the electrical energy storage means by the powertrain below a nominal maximum value for the selected driving mode, optionally the processor being further configured to provide an indication to a user that reduced powertrain performance may be experienced.

Thus, in some embodiments, as noted above, if the vehicle is operating in the first driving mode and the controller limits or reduces the amount of power drawn by the powertrain from the electrical energy storage means, the processor may provide an indication to a user that selection of a different driving mode, such as the second driving mode, may restore powertrain performance.

It is to be understood that different driving modes may have different maximum permitted powertrain power levels for that driving mode, the vehicle being configured not to permit powertrain power levels in excess of the respective maximum for the selected driving mode. In some embodiments, the maximum powertrain power level may not be dependent on the selected driving mode, i.e. it may be independent of the selected driving mode. For example, if a user demands maximum available powertrain power, for example by fully depressing an accelerator pedal, the vehicle may be configured to deliver maximum available powertrain power.

Optionally, if the vehicle is in the second driving mode the processor is configured to generate the control signal to control a proportion of the cooling power of the cooling means that is used to cool the electrical energy storage means relative to the cabin of the vehicle in dependence on the information indicative of temperature of the energy storage means, the processor being configured to control the proportion of the cooling power by causing a reduction in the proportion of cooling power used to cool the cabin of the vehicle relative to the electrical energy storage means by raising a target cabin temperature by a predetermined amount above a currently selected target value, optionally the processor being further configured to provide an indication to a user that reduced cabin cooling may be experienced.

Thus, in some embodiments, if the vehicle is operating in the second driving mode and the controller causes a reduction in the proportion of cooling power used to cool the cabin of the vehicle relative to the electrical energy storage means, the processor may provide an indication to a user that selection of a different driving mode, such as the first driving mode, may restore cabin cooling performance.

Optionally, the driving modes include both the first driving mode and the second driving mode, wherein when in the first driving mode the processor is configured to limit or reduce the amount of power drawn from the electrical energy storage means by the powertrain in dependence on the information indicative of the temperature of the energy storage means by an amount greater than any corresponding limitation or reduction in the amount of power drawn from the electrical energy storage means by the powertrain in dependence on the information indicative of the temperature of the electrical energy storage means when in the second driving mode.

Thus, in some embodiments, when in the first driving mode the controller reduces the amount of power drawn from the electrical energy storage means by the powertrain as the temperature of the electrical energy storage means increases by a greater amount relative to any corresponding reduction when in the second driving mode. In some embodiments, in the second driving mode the controller may not adjust the proportion of the cooling power of the cooling means that is used to cool the electrical energy storage means relative to the cabin of the vehicle as the temperature of the energy storage means increases. In some embodiments, if the temperature of the electrical energy storage means reaches a critical temperature, the controller may increase the proportion of cooling power used to cool the electrical energy storage means regardless of the currently selected driving mode.

The first driving mode may be referred to as a comfort mode in some embodiments, being a driving mode adapted for occupant comfort.

The second driving mode may be referred to as a dynamic mode (or sports mode or performance mode) in some embodiments, being a driving mode adapted for travel at relatively high rates of acceleration and vehicle speed.

Optionally, when the vehicle is in the first driving mode the controller is configured progressively to limit or reduce the amount of power drawn from the electrical energy storage means by the powertrain as the temperature of the energy storage means increases.

It is to be understood that the controller may progressively limit or reduce the amount of power drawn from the electrical energy storage means by the powertrain (and optionally not by the cabin cooling means) as the temperature of the electrical energy storage means increases.

Optionally, when the vehicle is in the second driving mode the controller is configured to adjust the proportion of the cooling power used to cool the electrical energy storage means in dependence on the information indicative of the temperature of the electrical energy storage means by an amount greater than any corresponding adjustment when in the first driving mode.

Thus, in some embodiments, when in the second driving mode the controller may increase the proportion of the cooling power of the cooling means used to cool the energy storage means by a greater amount as the temperature of the energy storage means increases relative to the corresponding situation when in the first driving mode. This has the advantage that cooling of the electrical energy storage means is prioritised over cabin cooling, enabling the electrical energy storage means to continue delivering electrical power to the powertrain to preserve vehicle powertrain performance.

It is to be understood that, in some embodiments, in the second driving mode the controller may reduce the amount of cooling power of the cooling means available to the cabin cooling means and not limit or reduce the amount of electrical power available to the powertrain (by limiting vehicle maximum speed, for example) as the temperature of the electrical energy storage means increases.

The controller may be configured to limit or reduce the amount of power drawn from the electrical energy storage means by the powertrain and the proportion of the cooling power of the cooling means that is available to cool the cabin relative to the electrical energy storage means in dependence on the temperature of the energy storage means.

In some embodiments, if the temperature of the energy storage means becomes sufficiently high, the controller may take action to compromise both powertrain performance and cabin cooling in order to prevent the temperature of the energy storage means from reaching an excessively high level. It is to be understood that excessively high temperature levels (such as 55 C or above, in some embodiments) may be reached in relatively high ambient temperatures (e.g. 40 C or above) and high powertrain power demand (e.g. the vehicle being operated at or close to maximum speed).

The controller may be configured to limit or reduce the amount of power drawn from the electrical energy storage means by the powertrain and the proportion of cooling power available to the cabin cooling means when the temperature of the energy storage means exceeds a predetermined value.

In some embodiments, the controller limits or reduces the amount of power consumed by only one of the powertrain or cabin cooling means when the temperature of the energy storage means exceeds a first predetermined value (in dependence on selected driving mode) but limits or reduces the amount of power consumed by both the powertrain and the cabin cooling means when the temperature of the energy storage means exceeds a second predetermined value greater than the first. The first temperature may be around 45 C in some embodiments, whilst the second temperature may be around 55 C. Other temperature values may be useful depending on the particular energy storage means.

Optionally, the vehicle has a third driving mode, wherein when the third driving mode is selected the controller is configured to limit or reduce the amount of power drawn from the electrical energy storage means by the powertrain and/or adjust the proportion of cooling means cooling power available to the cabin cooling means relative to operation in the first and second modes independently of the temperature of the energy storage means.

The third driving mode may be referred to as an economy or 'eco' mode and may be a mode in which the vehicle is adapted for extended range of travel relative to the first and second modes.

It is to be understood that, in the first and/or second driving modes, when the temperature of the energy storage means reaches a certain value the applied limitation or reduction in the amount of power consumed by the powertrain and/or cabin cooling means may be similar to that applied by the controller in the third mode at lower temperatures (and in some embodiments, all temperatures) of the energy storage means.

In a further aspect of the invention there is provided a vehicle comprising a controller according to another aspect, the vehicle further comprising a powertrain comprising an electric machine for providing motive power, electrical energy storage means for powering the electric machine, and cooling means for cooling a cabin of the vehicle and the electrical energy storage means, the vehicle being configured to operate in a selected one of a plurality of driving modes.

Optionally, the cooling means is powered by the electrical energy storage means.

In an aspect of the invention there is provided a method of controlling a vehicle operable in a selected one of at least a first and a second driving mode, the vehicle comprising
 a powertrain comprising an electric machine for providing motive power;
 cooling means; and
 electrical energy storage means for powering the electric machine,
 wherein the cooling means is configured to cool the electrical energy storage means and a cabin of the vehicle,
 the method comprising:
 receiving information indicative of a temperature of an energy storage means of the vehicle; and
 generating at a processor a control signal in dependence on the information indicative of temperature of the energy storage means and the selected driving mode of the vehicle,
 whereby
 if the vehicle is in the first driving mode the method comprises generating the control signal to limit or reduce an amount of power drawn from the electrical energy storage means by the powertrain in dependence on the information indicative of temperature of the energy storage means; and/or
 if the vehicle is in the second driving mode the method comprises generating the control signal to control a proportion of the cooling power of the cooling means that is available to cool the electrical energy storage means relative to the cabin of the vehicle in dependence on the information indicative of temperature of the electrical energy storage means.

The method may comprise, in the first driving mode, generating the control signal to limit or reduce an amount of power drawn from the electrical energy storage means by the powertrain in dependence on the information indicative of temperature of the energy storage means, the method comprising generating the control signal so as to limit or reduce the amount of power drawn from the electrical energy storage means by the powertrain by reducing a maximum speed of the vehicle below a nominal maximum for the selected driving mode.

Optionally the method comprises, in the first driving mode, generating the control signal to limit or reduce an amount of power drawn from the electrical energy storage means by the powertrain in dependence on the information indicative of temperature of the energy storage means, the method comprising generating the control signal so as to limit or reduce the amount of power drawn from the electrical energy storage means by the powertrain by reducing the maximum amount of power that may be drawn from the energy storage means by the powertrain below a nominal maximum value for the selected driving mode.

The method may comprise, in the second driving mode, generating the control signal so as to reduce the proportion of cooling power of the cooling means available to the cabin cooling means by raising a target cabin temperature by a predetermined amount above a currently selected target value.

The method may comprise, in the second driving mode, generating the control signal so as to limit the proportion of cooling power of the cooling means available to the cabin cooling means by reducing the proportion of cooling power that may be drawn by the cabin cooling means below a nominal maximum.

Optionally, when in the first driving mode, the method comprises generating the control signal so as to limit or reduce the amount of power drawn from the electrical energy storage means by the powertrain in dependence on the information indicative of the temperature of the energy storage means by an amount greater than any corresponding limitation or reduction in the amount of power drawn from the electrical energy storage means by the powertrain in dependence on the information indicative of the temperature of the energy storage means when in the second driving mode.

Optionally, when in the first driving mode, the method comprises generating the control signal so as to progressively limit or reduce the amount of power drawn from the electrical energy storage means by the powertrain as the temperature of the energy storage means increases.

Optionally, when in the second driving mode, the method comprises generating the control signal so as to limit or reduce a proportion of the cooling power of the cooling means available to the cabin cooling means in dependence on the information indicative of the temperature of the energy storage means by an amount greater than any corresponding limitation or reduction when in the first driving mode.

Optionally, the method comprises generating the control signal so as to limit or reduce the amount of power drawn from the electrical energy storage means by the powertrain and the proportion of cooling power of the cooling means available to the cabin cooling means in dependence on the temperature of the energy storage means.

It is to be understood that, in some embodiments, if a temperature of the energy storage means (such as a battery) becomes sufficiently high, the method may comprise limiting or reducing the amount of power consumed by the powertrain and the proportion of cooling power of the cooling means available to the cabin cooling means.

The method may comprise generating the control signal so as to limit or reduce the amount of power drawn from the electrical energy storage means by the powertrain and the proportion of cooling power of the cooling means available to the cabin cooling means when the temperature of the energy storage means exceeds a predetermined value.

Optionally, the driving modes include a third driving mode, whereby when the third driving mode is selected the method comprises generating the control signal so as to limit or reduce the amount of power drawn from the electrical energy storage means by the powertrain and/or the proportion of cooling power of the cooling means available to the cabin cooling means relative to operation in the first and second modes independently of the temperature of the energy storage means.

In some embodiments, in the third driving mode the method may comprise generating the control signal so as to limit or reduce the amount of power consumed by the powertrain and/or the proportion of cooling power of the cooling means available to the cabin cooling means relative to operation in the first and second modes regardless of the temperature of the energy storage means.

In an aspect of the invention there is provided a computer program comprising instructions which, when the program is executed by a computer, cause the computer to carry out the method of another aspect.

In another aspect of the invention there is provided a non-transitory, computer-readable storage medium storing instructions thereon that when executed by one or more processors causes the one or more processors to carry out the method of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying drawings, in which.

DETAILED DESCRIPTION

Figure 1:
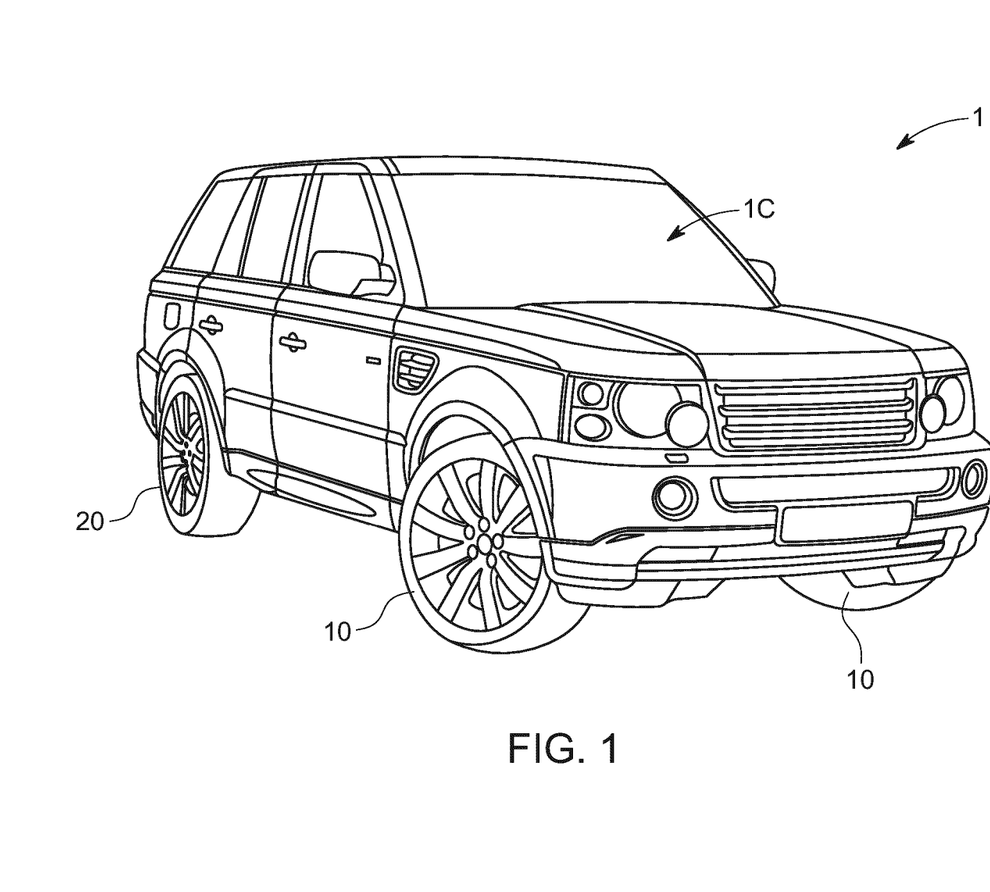
FIG. 1 is a schematic illustration of a vehicle according to an embodiment of the present invention.
Figure 2:
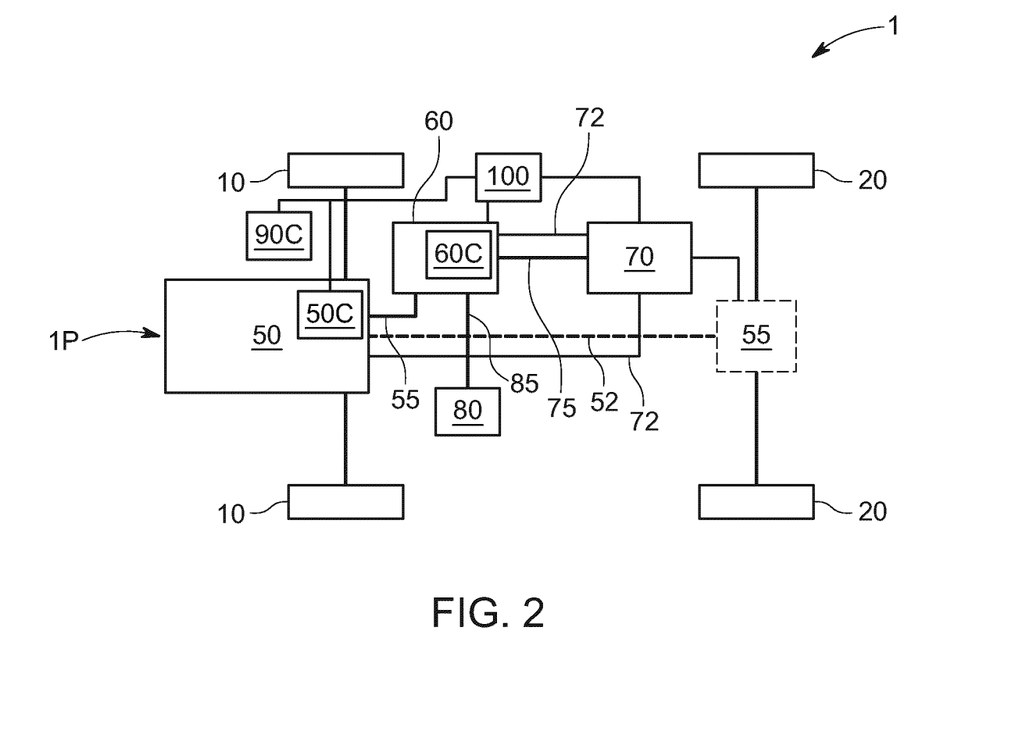
FIG. 2 is a schematic illustration of the vehicle of the embodiment of FIG. 1 in plan view showing a powertrain, cooling system, battery and controller.

FIG. 1 shows a vehicle 1 according to an embodiment of the present invention. FIG. 2 is a schematic illustration of the vehicle 1 of FIG. 1 in plan view.

As shown in FIG. 2, the vehicle 1 has a powertrain 1P that includes an electric drive (eDrive) unit 50 powered by a battery 70. The eDrive unit 50 is arranged to drive a pair of front wheels 10 of the vehicle 1. In some alternative embodiments, the eDrive unit 50 is also configured to drive a pair of rear wheels 20 via a drive shaft 52. In some still further embodiments, instead of the eDrive unit 50 driving the rear wheels 20, the powertrain 1P has an electric rear axle drive (ERAD) unit 55 that is configured to drive the rear wheels 20 when required. Other arrangements may be useful in some embodiments.

The eDrive unit 50 is arranged to be cooled by means of a cooling system 60 that is also configured to cool the battery 70 and a cabin 1C of the vehicle 1. The cabin 1C is cooled by means of a cabin heat exchanger 80 that is cooled by the cooling system 60.

Figure 3:
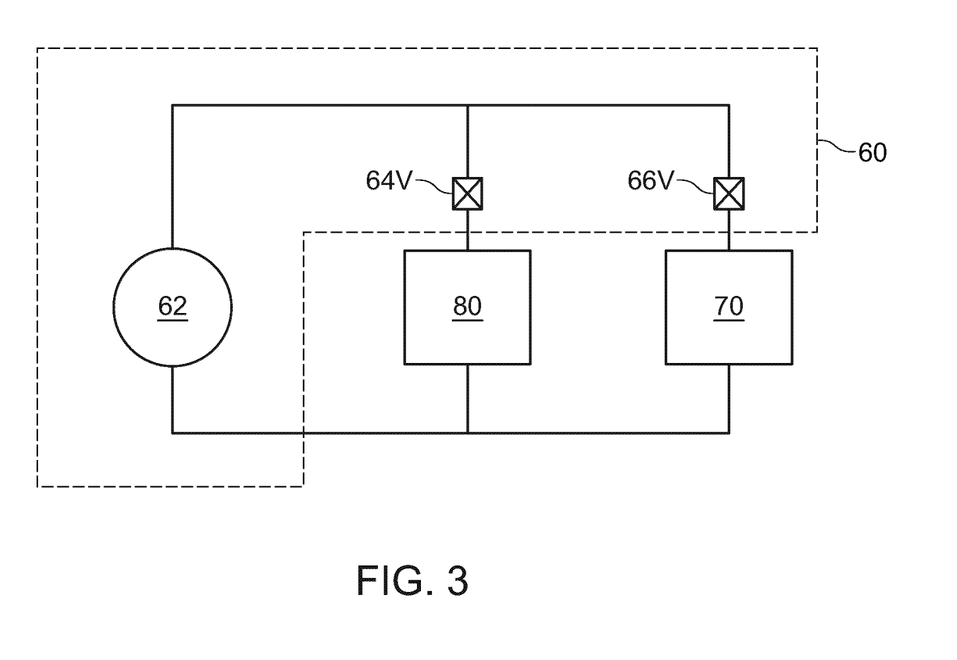
FIG. 3 is a schematic illustration of the cooling system of the vehicle of the embodiment of FIG. 1.

FIG. 3 illustrates schematically a refrigerant circuit of the cooling system 60 by means of which the battery 70 and cabin heat exchanger 80 are cooled. As shown in FIG. 3, the cooling system 60 includes a compressor 62 arranged to compress refrigerant and pump the refrigerant to the battery 70 and cabin heat exchanger 80. In some alternative embodiments, the refrigerant directed to the battery 70 in FIG. 3 may be arranged to cool a coolant such as a liquid coolant which is then pumped to the battery 70. Similarly, in some embodiments the refrigerant pumped to the cabin heat exchanger 80 may be arranged to cool a coolant such as a liquid coolant which is then pumped to the cabin heat exchanger 80.

In the embodiment of FIG. 3 the battery 70 and cabin heat exchanger 80 are connected in parallel with the compressor 62. The relative amount of refrigerant fed to the battery 70 and cabin heat exchanger 80, respectively, may be controlled by means of a pair of refrigerant expansion control valves 64V, 66V coupled upstream of the battery 70 and cabin heat exchanger 80, respectively under the control of a cooling system controller 60C.

Figure 4:
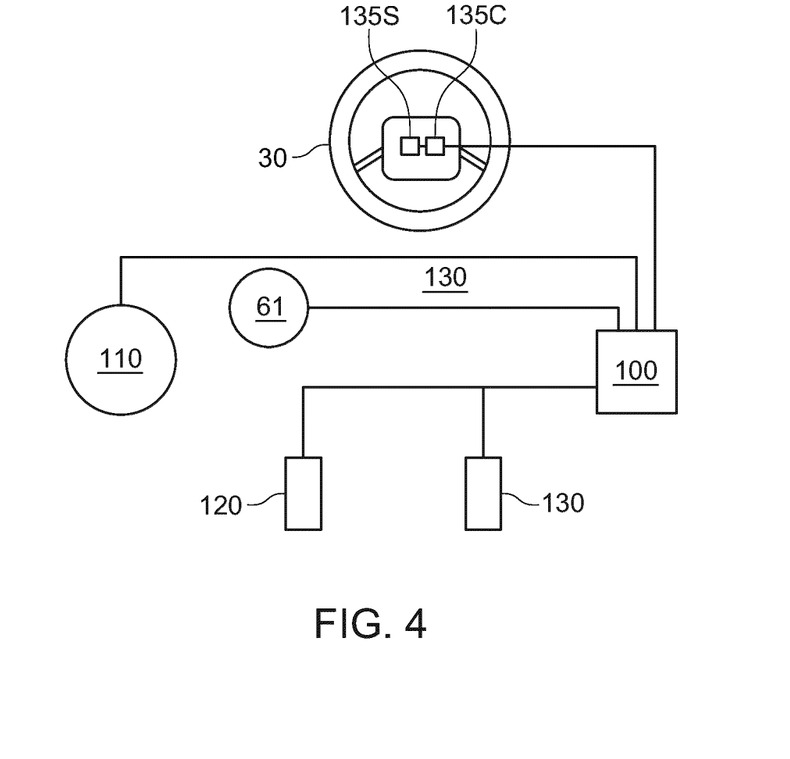
FIG. 4 is a schematic illustration of a control arrangement of the vehicle of the embodiment of FIG. 1.

FIG. 4 illustrates control inputs provided in the cabin 1C of the vehicle 1 and by means of which a user is able to control operation of the powertrain 1P and cabin cooling system 60. The control inputs include a brake pedal 120, an accelerator pedal 130, a driving mode selector dial 110, a cabin temperature selector dial 61 and cruise control 'set' and 'cancel' buttons 135S, 135C, respectively, mounted on a steering wheel 30 of the vehicle 1. In some embodiments, driving mode and/or cabin temperature may be selected by a different means in addition to or instead of a selector dial 110, 61. For example in some embodiments driving mode and/or cabin temperature may be selected by means of a touch screen input, or other switch means such as a flick switch or any other suitable means.

The brake pedal 120 and accelerator pedal 130 each provide a respective pedal position signal to the controller 100 indicative the amount of travel of the respective pedal 120, 130 as a percentage of maximum available travel.

The driving mode selector dial 110 is rotatable to one of three positions in the present embodiment. Each position corresponds to selection of a different driving mode, the modes being an 'economy' or 'eco' mode, a 'comfort' mode and a 'dynamic' mode. (The dynamic mode may also be referred to as a 'sports' or 'performance' driving mode). The controller 100 is configured to communicate the selected mode to the powertrain controller 50C (which in the present embodiment may also be referred to as the eDrive controller 50C) and braking system controller 90C. In some embodiments, the driving mode selector dial 110 may be configured to allow a user to select an 'automatic' or 'auto' mode in which the vehicle, for example at controller 100, determines the most appropriate driving mode at a given moment in time. For example, in some embodiments the controller 100 may select the most appropriate mode based at least in part on the driving style of the user and/or one or more features of the road or terrain over which the vehicle 1 is driving.

In each mode, one or more parameters associated with the eDrive controller 50C, braking system controller 90C and cooling system controller 60C may be configured in a manner appropriate to the particular mode. For example, in the 'comfort' mode the systems are configured in a manner intended to enhance occupant comfort whilst in the 'dynamic' mode the systems are configured in a manner intended to enhance vehicle performance in terms of speed. In the 'eco' mode the systems are configured to enhance vehicle range of travel.

In order to achieve this, the powertrain controller 50C has a set of maps that relate the accelerator pedal position signal to an amount of drive power that is required to be delivered by the eDrive unit 50. In the dynamic mode, the eDrive unit 50 is required to deliver a greater amount of drive power for a given accelerator pedal position than when the comfort or eco modes are selected, over a prescribed range of travel. In the present embodiment the prescribed range of travel is the range from substantially zero pedal travel to substantially 80% travel. Other values may be useful in some embodiments. Beyond 80% travel, the eDrive unit 50 is commanded to deliver substantially full power in each of the eco, comfort and dynamic modes.

In the comfort mode, the eDrive unit 50 delivers less power for a given amount of accelerator pedal travel (for accelerator pedal positions of up to 80% of full travel) than in the dynamic mode, as noted above, but more than for the eco mode for a given pedal position. Other arrangements may be useful in some embodiments.

In the dynamic mode, the braking system controller 90C is configured to cause the braking system to generate a greater amount of brake force for a given amount of pedal travel than in the comfort or eco modes, over a predetermined range of travel. In the present embodiment the predetermined range is the range from substantially no pedal travel to substantially 80% travel. Other values may be useful in some embodiments. The amount of brake force generated in the comfort mode as a function of brake pedal travel is similar in both the comfort and eco modes in the present embodiment. Other arrangements may be useful in some embodiments.

Beyond 80% travel of the brake pedal 120, the braking system 90C is commanded to deliver substantially maximum brake force in each of the eco, comfort and dynamic modes.

In some embodiments, the controller 100 may also communicate the selected driving mode to one or more other controllers in addition to the powertrain controller 50C and braking system controller 90C, such as a suspension system controller (where fitted). For example, in some embodiments a suspension system controller may cause the suspension system to operate with a reduced amount of damping in the comfort mode compared with the dynamic mode in order to enhance occupant comfort when in the comfort driving mode. Other arrangements may be useful in some embodiments.

The cabin temperature selector dial enables a user to set a desired temperature of the vehicle cabin 1C. In the dynamic and comfort modes, the controller 100 is configured to cause the cooling system controller 60C to provide cooling to the battery 70 and sufficient cooling to the cabin heat exchanger 80 to maintain the cabin 10 at the temperature demanded by the user by means of the cabin temperature selector dial 61. It is to be understood that, in the present embodiment, the eDrive unit 50 is cooled by a separate coolant circuit and not by the cooling system 60.

The cruise control 'set' button 135S enables a user to set a desired speed of travel of the vehicle 1 by depressing the button 135S when the vehicle is at a desired cruising speed. The cruise control system can be cancelled by pressing the 'cancel' button 135C or brake pedal 120. The controller 100 informs the powertrain controller 50C when a given button 135C, 135S is depressed, responsive to which the controller 100 is operable to activate or deactivate a cruise control function of the powertrain controller 50C. In the present embodiment, the cruise control function of the controller 50C is only available if the vehicle speed exceeds a predetermined value, in the present embodiment 30 kph. Other values of speed may be useful in some alternative embodiments such as 25 kph, 35 kph or any other suitable value.

The controller 100 is configured to monitor the temperature of the battery 70 by reference to a battery temperature signal received periodically by the controller 100. The controller 100 is configured to implement a derate constraint in respect of operation of the powertrain 1P by the powertrain controller 50C in dependence on the driving mode in which the vehicle 1 is operating. The controller 100 is also configured to implement a cooling system derate constraint in respect of operation of the cooling system 60 by the cooling system controller 60C in dependence on the driving mode.

Figure 5:
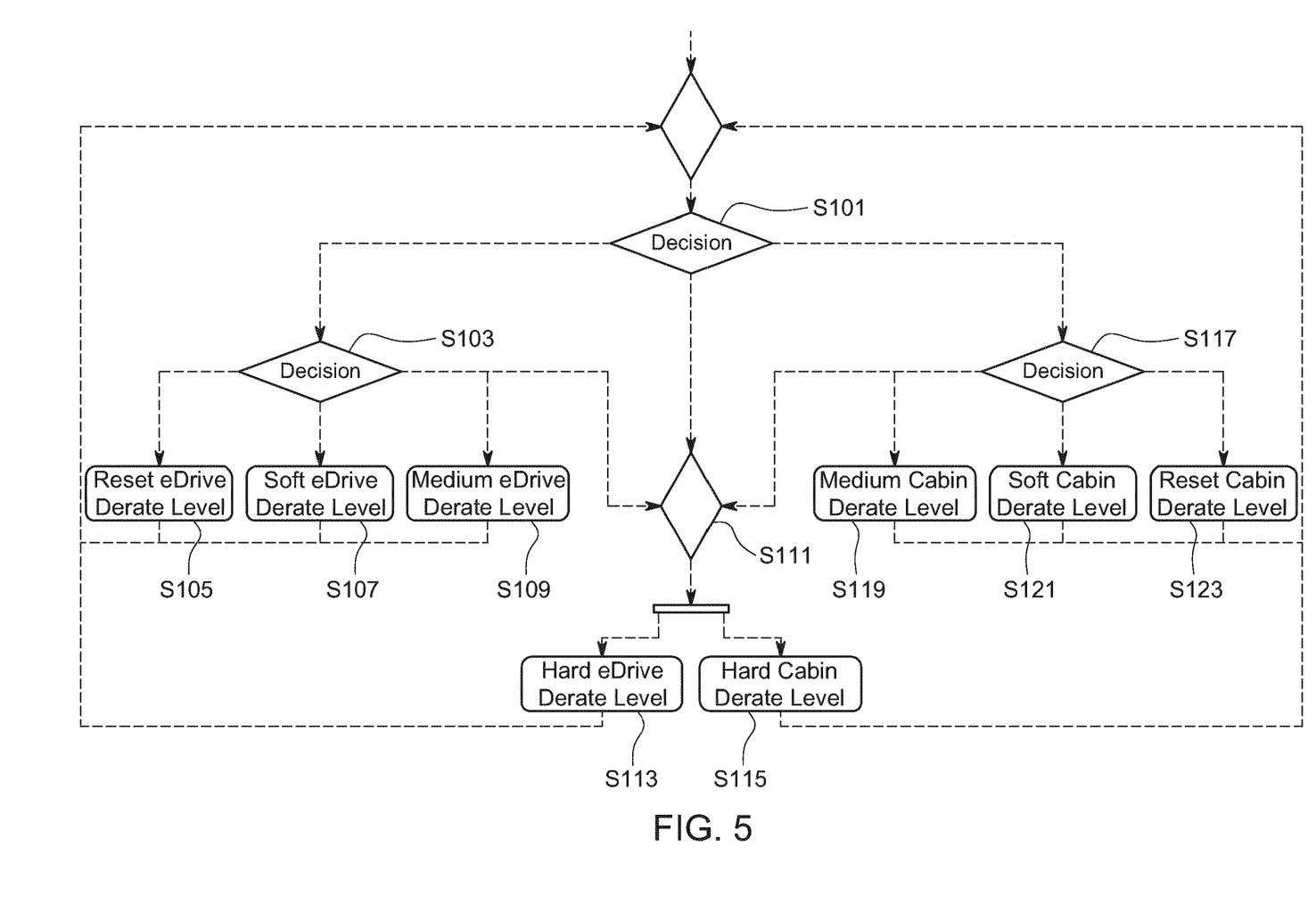
FIG. 5 is a flow diagram illustrating operation of the vehicle of the embodiment of FIG. 1.

FIG. 5 illustrates the manner in which the constraints are applied to the powertrain 1P and cooling system 60 in the present embodiment.

At step S101, the controller 100 determines in which driving mode the vehicle 1 is operating. If the vehicle 1 is in the comfort driving mode, the controller 100 continues at step S103; if the vehicle 1 is in the dynamic driving mode the controller 100 continues at step S117, and if the vehicle 1 is in the eco driving mode the controller 100 continues at step S111.

At step S103 the controller 100 proceeds to one of steps S105, S107, S109 or S115 in dependence on the temperature of the battery 70.

If the temperature of the battery 70 is at or above a soft eDrive derate temperature value Tse but is less than a medium eDrive derate temperature value Tme, the controller 100 proceeds to step S107. At step S107 the controller 100 commands the powertrain (eDrive) controller 50C to apply a soft eDrive derate constraint in which the eDrive controller 50C is configured to prevent the vehicle 1 from exceeding a soft eDrive derate speed value Vse. In the present embodiment the soft eDrive derate speed value Vse is selected to be a predetermined amount below a nominal maximum vehicle speed value Vmax. The nominal maximum vehicle speed value Vmax is a value of maximum speed at which the vehicle 1 is permitted to operate that is pre-programmed into the eDrive controller 50C, for example as a vehicle factory setting. In the present embodiment Vmax is 225 kph and the predetermined amount is 20 kph (and therefore Vse is 205 kph) although other values may be useful in some alternative embodiments. The controller then continues at step S101.

If the temperature of the battery 70 is at or above the medium eDrive derate temperature value Tme but less than a hard eDrive derate temperature value The, the controller 100 proceeds from step S103 to step S109. At step S109 the controller 100 commands the eDrive controller 50C to apply a medium eDrive derate constraint in which the eDrive controller 50C is configured to prevent the vehicle 1 from exceeding a medium eDrive derate speed value Vme. In the present embodiment the medium eDrive derate speed value Vme is selected to be lower than the soft eDrive derate speed value Vse by a predetermined amount, in the present embodiment the predetermined amount is 20 kph (and therefore Vme is 185 kph). Other values of predetermined amount may be useful in some alternative embodiments. The controller then continues at step S101.

In the event that the battery 70 is at or above the hard eDrive derate temperature value The, the controller 100 continues to step S111.

At step S111 the controller 100 determines to cause the eDrive controller 50C to apply a hard eDrive derate constraint (step S113) in which the eDrive controller 50C is configured to prevent the vehicle 1 from exceeding a hard eDrive derate speed value Vhe. In the present embodiment, the hard eDrive derate speed value Vhe is the same as the medium derate speed value Vme, i.e. 20 kph below Vse. In some alternative embodiments the hard eDrive derate speed value Vhe is less than the medium eDrive derate speed value Vme.

In addition to causing the eDrive controller 50C to apply the hard eDrive derate constraint at step S113, at step S111 the controller 100 also determines to cause the cooling system 60 to apply a hard cooling system derate constraint (at step S115), in which the controller 100 raises a target temperature of the cabin 1C of the vehicle 1 by a predetermined amount above the value that has been set by the user by means of the cabin temperature selector dial 61. In the present embodiment, the predetermined amount is 4 Celsius although other values may be useful in some alternative embodiments.

Raising the cabin target temperature has the effect of reducing the amount of power required to cool the cabin 1C to the target temperature. In some alternative embodiments, instead of raising the target cabin temperature by an amount that has been pre-programmed into the controller 100, the controller 100 may limit the amount of power that the cooling system 60 is able to employ for the purpose of cooling the cabin 1C of the vehicle 1. For example, the controller 100 may limit the amount to a predetermined amount of power. The amount of power may be limited by limiting a flow rate of air generated by the cabin heat exchanger 80, limiting the flow rate of refrigerant through the cabin heat exchanger via the refrigerant expansion control valve 64V, or by any other suitable means.

After executing step S111, the controller 100 continues at step S101.

In the event that the battery temperature is less than the soft eDrive derate battery temperature Ts, then at step S105 the controller 100 is configured to remove any eDrive derate constraint that has been applied and the controller continues at step S101.

It is to be understood that other forms of eDrive derate constraint may be useful, such as limiting an amount of power that the eDrive can draw from the battery 70, in addition to or in instead of limiting a maximum speed of the vehicle 1.

As noted above, if at step S101 the controller 100 determines that the vehicle 1 is operating in the dynamic mode, the controller 100 continues at step S117.

At step S117 the controller 100 proceeds to one of steps S111, S119, S121 or S123 in dependence on the temperature of the battery 70.

If the temperature of the battery 70 is at or above a soft cooling system derate temperature value Tsc but is less than a medium cooling system derate temperature value Tmc, the controller 100 proceeds to step S121.

At step S121 the controller 100 applies a soft cooling system derate constraint whereby the controller 100 increases the value of cabin target temperature transmitted to the cooling system controller 60C by a predetermined, stored amount above that set by the user by means of the temperature selector 61. In the present embodiment the predetermined amount is 2 Celsius although other values may be useful in some alternative embodiments.

A consequence of raising the cabin target temperature is that the proportion of refrigerant compressed by the compressor 62 of the cooling system (FIG. 3) that is fed to the cabin heat exchanger 80 is reduced in favour of the battery 70, thereby increasing cooling of the battery 70. The controller then continues at step S101.

If the temperature of the battery 70 is at or above a medium cooling system derate temperature value Tmc but is less than a hard cooling system derate temperature value Thc, the controller 100 proceeds to step S119.

At step S119 the controller 100 applies a medium cooling system derate constraint whereby the controller 100 increases the value of cabin target temperature transmitted to the cooling system controller 60C by a predetermined, stored amount above the user selected amount. In the present embodiment the predetermined amount is 4 Celsius although other values may be useful in some alternative embodiments.

The proportion of refrigerant compressed by the compressor 62 that is fed to the cabin heat exchanger 80 is therefore further reduced in favour of the battery 70, thereby further increasing cooling of the battery 70. The controller then continues at step S101.

In some embodiments, the controller 100 may increase the target cabin temperature by a predetermined amount above that set by the controller 100 when the soft cooling system derate constraint is applied, rather than increasing by a predetermined amount above that set by the user. Other arrangements may be employed in some alternative embodiments.

Following step S119 the controller continues at step S101.

If the temperature of the battery 70 is at or above a hard cooling system derate temperature value Thc, the controller 100 proceeds to step S111, described above.

In the event that the battery temperature is less than the soft cooling derate battery temperature Tsc, then at step S123 the controller 100 is configured to remove any cooling system derate constraint that has been applied, whereby the controller 100 commands the cooling system 60 to cool the cabin to the target temperature selected by the user, and the controller continues at step S101.

In the present embodiment, both the soft eDrive derate temperature Tse and soft cooling derate temperature Tsc are substantially 45 Celsius. Values other than 45C may be useful, however, and the values of Tse and Tsc may be different in some embodiments.

In the present embodiment, both the medium eDrive derate temperature Tme and medium cooling derate temperature Tmc are substantially 50 Celsius. Values other than 50C may be useful, however, and the values of Tme and Tmc may be different in some embodiments.

In the present embodiment, both the hard eDrive derate temperature The and the hard cooling derate temperature Thc are substantially 55 Celsius. Values other than 55C may be useful, and the values of The and Thc may be different in some embodiments.

As noted above, if at step S101 the controller 100 determines that the vehicle 1 is in the eco driving mode the controller 100 continues at step S111 described above.

In the present embodiment, at steps S107 and S109 the controller 100 is configured to provide an indication to a user that performance of the powertrain 1P of the vehicle 1 has been derated.

In response to this indication, if the user then selects the dynamic driving mode, then at step 101 the controller 100 continues at step S117 and no longer derates the powertrain 50C (unless step S111 is subsequently executed). In some embodiments, the controller 100 may provide an indication that the performance of the powertrain 1P can be restored by selecting the dynamic driving mode.

Similarly, in some embodiments, at steps S119 and S121 the controller 100 is configured to provide an indication to a user that cabin cooling has been derated.

In response to this indication, if the user then selects the comfort driving mode, then at step 101 the controller 100 continues at step S103 and no longer derates cabin cooling (unless step S111 is subsequently executed). The controller 100 may provide an indication that cabin cooling performance may be restored by selecting the comfort driving mode.

Figure 6:
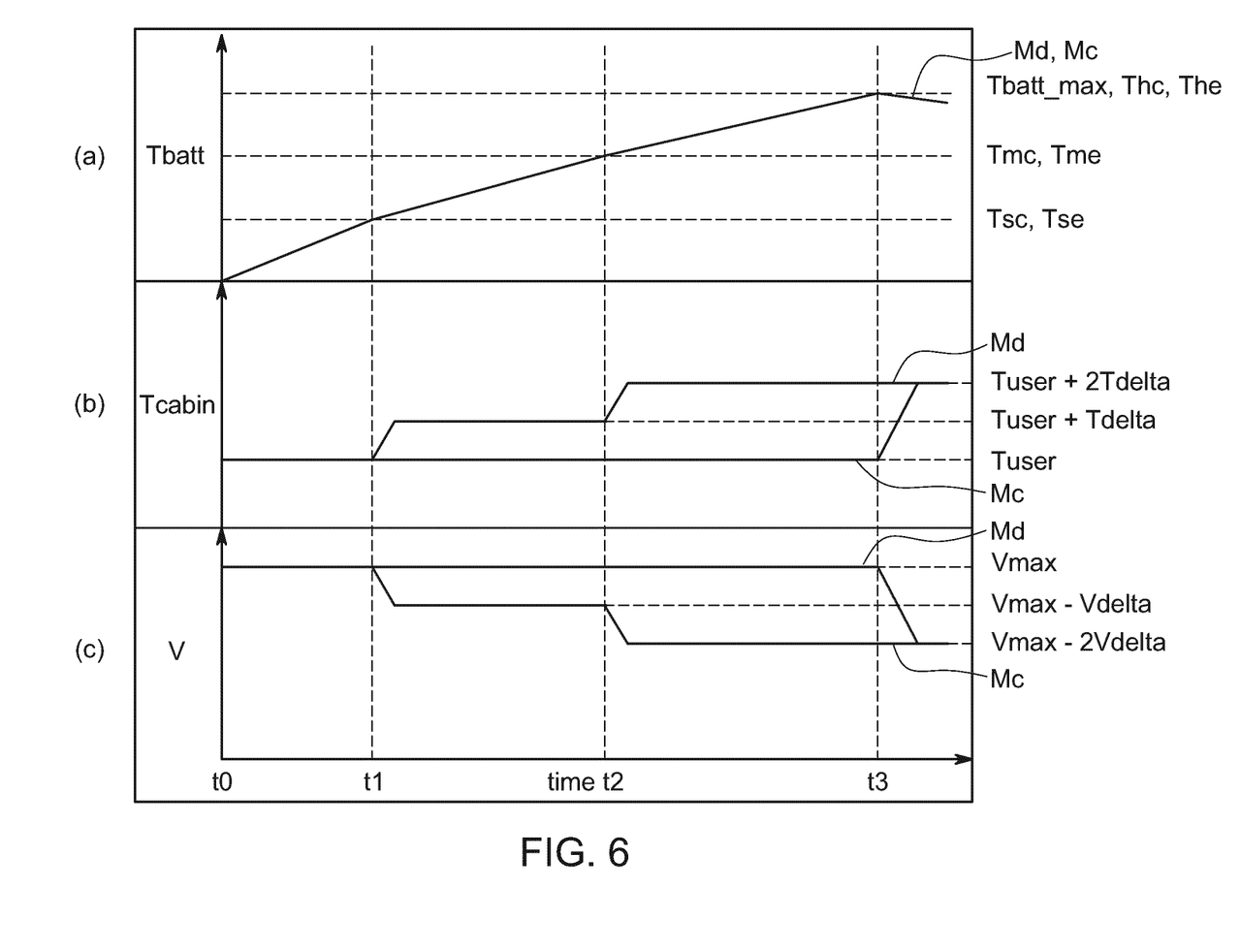
FIG. 6 is a plot of battery temperature, cabin temperature and vehicle speed as a function of time in two example scenarios.

FIG. 6 illustrates operation of the vehicle 1 in two example scenarios in which the vehicle 1 is travelling in relatively warm ambient air, such as air having a temperature above 20C. Three plots are shown in FIG. 6, respectively showing battery temperature Tbatt, FIG. 6(a), cabin temperature Tcabin, FIG. 6(b) and vehicle speed V, FIG. 6(c), as a function of time. Two traces are shown in each of FIGS. 6(a), 6(b) and FIG. 6(c), traces Md and Mc. Trace Md corresponds to vehicle operation in the dynamic driving mode whilst trace Mc corresponds to vehicle operation in the comfort driving mode.

It can be seen from FIG. 6 that, at time t0, the vehicle 1 is travelling at its maximum speed Vmax, in the present embodiment 225 kph (FIG. 6(c)). The battery temperature Tbatt can be seen to be increasing (FIG. 6(a)). Cabin temperature Tcabin is substantially constant at a temperature Tuser set by the user by means of cabin temperature selector dial 61 (FIG. 6(b)).

At time t1, the temperature of the battery Tbatt reaches Tse (and therefore Tsc, which has the same value in the present embodiment).

In the case that the vehicle 1 is in the comfort driving mode, once Tbatt reaches Tse (at time t1) the controller 100 commands the eDrive unit 50 to apply a powertrain derate constraint in which the controller 100 causes the eDrive controller 50C to reduce the maximum allowable vehicle speed by Vdelta, in the present embodiment 20 kph, i.e. from 225 kph to 205 kph. As shown in the plot of vehicle speed as a function of time, FIG. 6(c), the eDrive controller 50C causes the vehicle speed to fall gradually to 205 kph. As a result of reducing vehicle speed, the temperature of the battery, Tbatt, reduces the rate of temperature rise between Tse and Tme. As shown in FIG. 6(b), Tcabin remains unchanged (trace Mc). Thus, in the comfort driving mode, the controller 100 prioritises cabin temperature (and therefore occupant comfort) over vehicle speed by derating powertrain operation.

In contrast, in the case that the vehicle 1 is in the dynamic driving mode, once the battery temperature reaches Tsc the controller 100 commands the cooling system controller to increase cabin temperature by Tdelta, in the present embodiment 2C, above the current user selected value instead of commanding the eDrive controller 50C to reduce maximum vehicle speed. As can be seen from FIG. 6(a), this has the effect of reducing the rate of battery temperature rise between Tsc and Tmc since more refrigerant of the cooling system 60 is directed to cooling the battery 70. As may be seen from FIG. 6(c), vehicle speed is able to remain at Vmax (trace Md). Thus, in the dynamic driving mode, the controller 100 prioritises vehicle speed over cabin temperature (and therefore occupant comfort).

As shown in FIG. 6(a), at time t2 the temperature of the battery Tbatt reaches temperature Tme (and therefore Tmc, which has the same value in the present embodiment).

In the case that the vehicle 1 is in the comfort driving mode, once Tbatt reaches Tme the controller 100 commands the eDrive unit 50 to apply a medium powertrain derate constraint in which the controller 100 causes the eDrive controller 50C to reduce the maximum allowable vehicle speed by a further amount Vdelta, i.e. by 20 kph below that imposed by the soft powertrain derate constraint, i.e. from 205 kph to 185 kph. As shown in FIG. 6(c), the eDrive controller 50C causes the vehicle speed to fall gradually to a maximum of 185 kph. As a result of reducing vehicle speed, the temperature of the battery, Tbatt, stabilises at a temperature between Tme and The. Cabin temperature Tcabin, however, is unaffected as shown in FIG. 6(b). Thus, in the comfort driving mode, the controller 100 again prioritises cabin temperature (and therefore occupant comfort) over vehicle speed.

In contrast, in the case that the vehicle 1 is in the dynamic driving mode, when Tbatt reaches Tmc the controller 100 commands the cooling system controller to increase cabin temperature by a further amount Tdelta, i.e. 4C, above the current user selected value instead of commanding the eDrive controller 50C to reduce maximum vehicle speed. Thus, in the dynamic driving mode, the controller again 100 prioritises vehicle speed over cabin temperature (and therefore occupant comfort). As can be seen from FIG. 6(a), this has the effect of reducing the rate of battery temperature rise between Tmc and The.

As shown in FIG. 6(a), at time t3 the temperature of the battery Tbatt reaches temperature The (and therefore Thc, which has the same value in the present embodiment).

If battery temperature Tbatt exceeds The whilst the vehicle 1 is in the comfort driving mode, or if Tbatt exceeds Thc whilst the vehicle is in the dynamic driving mode, the controller applies both a hard eDrive derate constraint and in addition a hard cooling system derate constraint. In the present embodiment, the hard eDrive derate constraint is the same as the medium eDrive derate constraint and the hard cooling system derate constraint is the same as the medium cooling system derate constraint although they may be different in some alternative embodiments.

As shown in FIG. 6(a), at time t3, for the scenario in which the vehicle 1 is in the dynamic mode (trace Md), Tbatt exceeds Thc and the controller 100 reduces the maximum allowable vehicle speed by 40 kph, resulting in a decrease in vehicle speed to 185 kph as shown in FIG. 6(c). Thus, both cabin cooling and powertrain performance are derated in order to control battery temperature.

As also shown in FIG. 6(a), at time t3, for the scenario in which the vehicle 1 is in the comfort mode (trace Mc), Tbatt exceeds The and the controller 100 raises cabin temperature by a 4C as shown in FIG. 6(b). Thus, both cabin cooling and powertrain performance are derated in order to control battery temperature.

Embodiments of the present invention have the advantage that driver enjoyment of a vehicle may be preserved even when a battery of the vehicle is operating close to an upper temperature limit thereof, for example during relatively high rates of current drain from the battery. The vehicle prioritises certain vehicle systems (powertrain or cabin cooling system) in dependence on the selected driving mode, which may be user selected. Thus, the vehicle may prioritise the performance of certain systems based on a user preference.

In some embodiments, a vehicle may be configured to allow a user to indicate a preference as to which vehicle system's performance is to be compromised relative to another independently of any selected driving mode. For example, some vehicles may not be provided with a plurality of driving modes such as dynamic and comfort modes, in which case a controller may prioritise vehicle system operation based on other information input to the controller, such as explicit user preference for one system over another, for example by selection from a menu. Thus, a user may in some embodiments be provided with a choice to prefer one of 'occupant comfort', 'powertrain performance' and/or 'range' over the other(s). If 'range' is preferred then the system may derate both a powertrain and cooling system throughout operation in that mode, regardless of battery temperature, so as to enhance vehicle range of travel. If 'occupant comfort' is preferred, the system may derate powertrain performance and not cabin cooling, whilst if 'powertrain performance' is preferred, the system may derate cooling system performance and not powertrain performance. Other arrangements may be useful in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a vehicle, the vehicle comprising:
a powertrain comprising an electric machine for providing motive power;
a cooling system; and
an electrical energy storage device for powering the electric machine,
wherein the cooling system is configured to cool the electrical energy storage device and a cabin of the vehicle and the vehicle is configured to operate in a first or second driving mode,
the controller comprising:
an input for receiving information indicative of a temperature of the energy storage device; and
a processor arranged to generate a control signal in dependence on the information indicative of temperature of the energy storage device and information indicative of the selected driving mode of the vehicle, wherein:
when the vehicle is in the first driving mode the processor is configured to generate the control signal to limit or reduce an amount of power drawn from the electrical energy storage device by the powertrain in dependence on the information indicative of temperature of the energy storage device; and
when the vehicle is in the second driving mode the processor is configured to generate the control signal to control a proportion of the cooling power of the cooling system that is available to cool the electrical energy storage device relative to the cabin of the vehicle in dependence on the information indicative of temperature of the energy storage device.

2. A controller according to claim 1 configured to limit or reduce the amount of power drawn by the powertrain from the electrical energy storage device by reducing a maximum speed of the vehicle below a nominal maximum for the selected driving mode, optionally the processor being further configured to provide an indication to a user that reduced powertrain performance may be experienced.

3. A controller according to claim 1 configured to limit or reduce the amount of power drawn from the electrical energy storage device by the powertrain by reducing the maximum amount of power that may be drawn from the electrical energy storage device by the powertrain below a nominal maximum value for the selected driving mode, optionally the processor being further configured to provide an indication to a user that reduced powertrain performance may be experienced.

4. A controller according to claim 1 wherein if the vehicle is in the second driving mode the processor is configured to generate the control signal to control a proportion of the cooling power of the cooling system that is used to cool the electrical energy storage device relative to the cabin of the vehicle in dependence on the information indicative of temperature of the energy storage device, the processor being configured to control the proportion of the cooling power by causing a reduction in the proportion of cooling power used to cool the cabin of the vehicle relative to the electrical energy storage device by raising a target cabin temperature by a predetermined amount above a currently selected target value, optionally the processor being further configured to provide an indication to a user that reduced cabin cooling may be experienced.

5. A controller according to claim 1 wherein the driving modes include both the first driving mode and the second driving mode, wherein when in the first driving mode the processor is configured to limit or reduce the amount of power drawn from the electrical energy storage device by the powertrain in dependence on the information indicative of the temperature of the energy storage device by an amount greater than any corresponding limitation or reduction in the amount of power drawn from the electrical energy storage device by the powertrain in dependence on the information indicative of the temperature of the electrical energy storage device when in the second driving mode.

6. A controller according to claim 1 wherein when the vehicle is in the first driving mode the controller is configured progressively to limit or reduce the amount of power drawn from the electrical energy storage device by the powertrain as the temperature of the energy storage device increases.

7. A controller according to claim 5 wherein when the vehicle is in the second driving mode the controller is configured to adjust the proportion of the cooling power used to cool the electrical energy storage device in dependence on the information indicative of the temperature of the electrical energy storage device by an amount greater than any corresponding adjustment when in the first driving mode.

8. A controller according to claim 1 configured to limit or reduce the amount of power drawn from the electrical energy storage device by the powertrain and the proportion of the cooling power of the cooling system that is available to cool the cabin relative to the electrical energy storage device in dependence on the temperature of the energy storage device.

9. A controller according to claim 8 configured to limit or reduce the amount of power drawn from the electrical energy storage device by the powertrain and the proportion of cooling power available to the cabin cooling system when the temperature of the energy storage device exceeds a predetermined value.

10. A controller according to claim 1 wherein the vehicle has a third driving mode, wherein when the third driving mode is selected the controller is configured to limit or reduce the amount of power drawn from the electrical energy storage device by the powertrain and/or adjust the proportion of cooling system cooling power available to the cabin cooling system relative to operation in the first and second modes independently of the temperature of the energy storage device.

11. A vehicle comprising a controller according to claim 1, the vehicle further comprising a powertrain comprising an electric machine for providing motive power, electrical energy storage device for powering the electric machine, and cooling system for cooling a cabin of the vehicle and the electrical energy storage device, the vehicle being configured to operate in a selected one of a plurality of driving modes.

12. A vehicle according to claim 11 wherein the cooling system is powered by the electrical energy storage device.

13. A method of controlling a vehicle operable in a selected one of at least a first and a second driving mode, the vehicle comprising:
 a powertrain comprising an electric machine for providing motive power;
 a cooling system; and
 an electrical energy storage device for powering the electric machine,
 wherein the cooling system is configured to cool the electrical energy storage device and a cabin of the vehicle,
 the method comprising:
 receiving information indicative of a temperature of an energy storage device of the vehicle; and
 generating at a processor a control signal in dependence on the information indicative of temperature of the energy storage device and the selected driving mode of the vehicle,
 whereby
 when the vehicle is in the first driving mode, generating the control signal to limit or reduce an amount of power drawn from the electrical energy storage device by the powertrain in dependence on the information indicative of temperature of the energy storage device; and
 when the vehicle is in the second driving mode, generating the control signal to control a proportion of the cooling power of the cooling system that is available to cool the electrical energy storage device relative to the cabin of the vehicle in dependence on the information indicative of temperature of the electrical energy storage device.

14. A computer program comprising instructions which, when the program is executed by a computer, cause the computer to carry out the method of claim 13.

15. A non-transitory, computer-readable storage medium storing instructions thereon that when executed by one or more processors causes the one or more processors to carry out the method of claim 13.

* * * * *